United States Patent [19]

Specht et al.

[11] Patent Number: 4,941,369
[45] Date of Patent: Jul. 17, 1990

[54] BICYCLE HANDLE GRIP ASSEMBLY

[75] Inventors: Brian Specht, Northport; Robert Ippolito, Massapequa, both of N.Y.

[73] Assignee: Cycle Products Company, Commack, N.Y.

[21] Appl. No.: 334,617

[22] Filed: Apr. 6, 1989

[51] Int. Cl.$^5$ ............................................. B62K 21/26
[52] U.S. Cl. .................................... 74/551.9; 74/551.8
[58] Field of Search ................. 74/551.9, 551.1, 551.8, 74/489; 446/193, 192, 184; 280/288.4, 288.2, 289 H, 289 R

[56] References Cited

U.S. PATENT DOCUMENTS

| | | | |
|---|---|---|---|
| 584,220 | 6/1897 | Gunsaul | 74/551.9 |
| 587,388 | 8/1897 | Conard | 74/551.9 |
| 593,162 | 11/1897 | Miller | 74/551.9 |
| 597,108 | 1/1898 | Elton et al. | 74/551.9 |
| 599,131 | 2/1898 | King | 74/551.9 |
| 1,630,367 | 5/1927 | Woodbridge | 74/489 X |
| 2,094,217 | 9/1937 | Meredith | 74/551.9 |
| 3,251,241 | 5/1966 | Francis | 74/551.8 |
| 3,713,350 | 1/1973 | Brilando | 74/551.9 |
| 3,757,731 | 9/1973 | Pappas et al. | 74/551.9 X |
| 4,843,905 | 7/1989 | Jean | 74/551.9 |

FOREIGN PATENT DOCUMENTS 87 0862  3/1942  France ....................... 74/551.9

*Primary Examiner*—Vinh T. Luong
*Attorney, Agent, or Firm*—Gottlieb, Rackman & Reisman

[57] ABSTRACT

A bicycle handle grip assembly is provided. The handle grip assembly includes a flexible housing mounted along at least a portion of the outside surface of the handle grip. The housing communicates with the outside via a pathway that retains a reed assembly mounted therein. When the housing of the handle grip assembly is compressed, air inside the housing is forced through the pathway and past the reed assembly, thereby producing an alerting sound.

4 Claims, 1 Drawing Sheet

U.S. Patent   Jul. 17, 1990   4,941,369
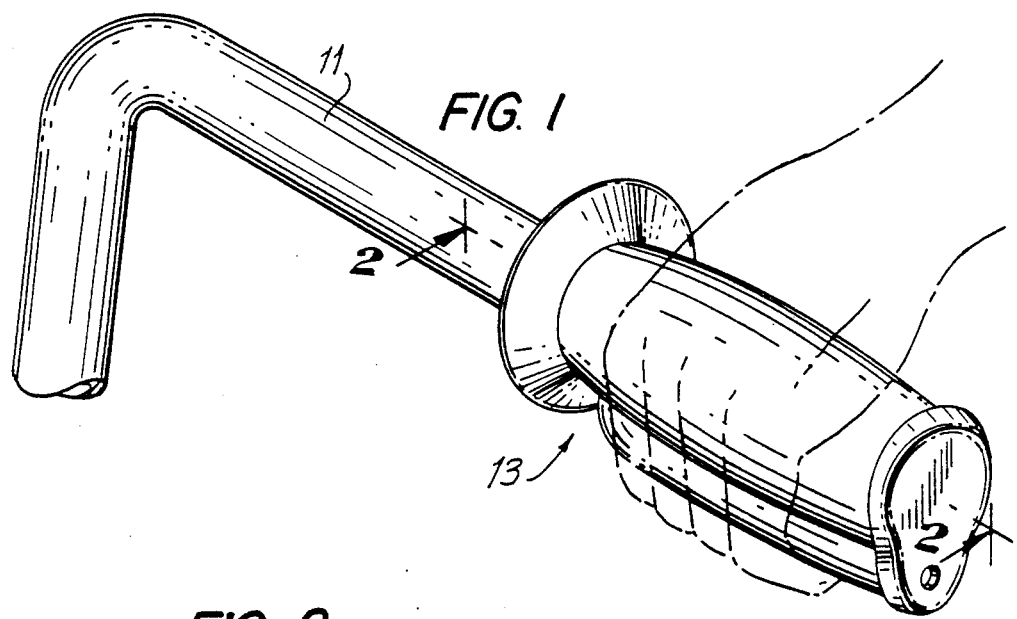
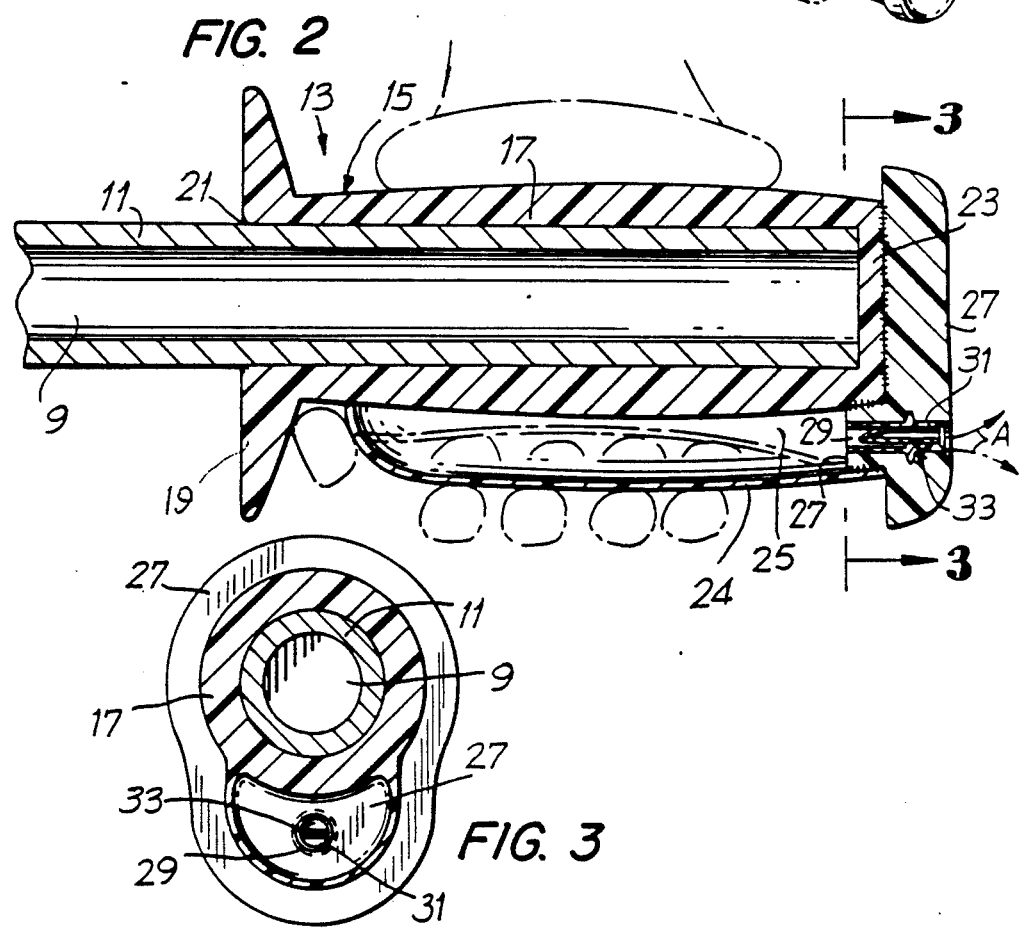

BICYCLE HANDLE GRIP ASSEMBLY

BACKGROUND

This invention related to a bicycle handle grip assembly, and more particularly to a grip assembly which incldes a flexible housing mounted therein which may be compressed to produce an alerting sound.

Although most bicycles do not come standard with a horn or bell, these items are easily available from most bicycle and other recreational stores. The horn or bell is attached to the bicycle, preferably on the handle bars so that the rider has easy access thereto.

These horns and/or bells require the attachment to the bike by means of certain tools, which may be difficult to accomplish for the young rider. In addition, if the horn or bell is not positioned appropriately, the horn or bell could interfere with the visibility of the rider or the riders operation of the gear shift on multi speed bicycles.

Accordingly, it would be desirable to provide a handle grip assembly that includes a horn or other alerting mechanism, and which overcomes the above disadvantages.

SUMMARY OF THE INVENTION

Generally speaking, in accordance with the invention, a bicycle handle grip assembly is described. The handle grip assembly includes a flexible housing mounted along at least a portion of the outside surface of the handle grip. The housing communicates with the outside via a pathway that retains a reed assembly mounted therein. When the housing of the handle grip assembly is compressed, air inside the housing is forced through the pathway and past the reed assembly, thereby producing an alerting sound.

Accordingly, it is an object of the invention to provide a new and improved bicycle handle grip assembly.

It is another object of the invention to provide a bicycle handle grip assembly that includes a built in air cavity that when squeezed pushes air through a reed to produce a squeeking sound.

Yet a further object of the invention is to provide a bicycle handle grip assembly which functions both as a grip and as a bicycle horn.

Still another objects and advantages of the invention will in part be obvious and will in part be apparent from the following description.

The invention accordingly comprises a product possessing the features, properties and the relation of components which will be exemplified in the product hereinafter described, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 1 is a perspective view of a bicycle handle grip assembly in accordance with the invention mounted on the end of a bicycle handle;

FIG. 2 is a cross-sectional view taken along line 2—2 of FIG. 1; and

FIG. 3 is a cross-sectional view taken along line 3—3 of FIG. 2.

DETAILED DESCRIPTION OF PREFERRED EMBODIMENT

Referring to FIGS. 1-3, a bicycle handle grip assembly in accordance with the invention is shown mounted on the end of a bicycle handle bar 11. Bicycle handle grip assembly 13 includes a grip member generally designated at 15, a housing 24 disposed along the underside of said grip member and an end member or cap 27.

Grip member 15 consists of a tubular body 17 and a flange 19 connected thereto disposed at the forward end of tubular body 17. Tubular body 17 and flange 19 are formed with a tubular opening 21 for receiving the end of bar 11, as shown in FIG. 2. When mounting grip assembly 13 to the end of handle bar 11, bar 11 is force fit through the entire length of tubular opening 21 so that the forwardmost end thereof is flush against a wall 23 of grip member 15.

Housing 24 is made of a substantially flexible material and with tubular body 17 defines a cavity 25. Cap 27 is mounted over wall 23 of grip member 15 and includes an opening or pathway 29, as shown in FIG. 2. Pathway 29 runs transversly through cap 27 and communicates with cavity 25 of housing 24 and the outside.

Pathway 29 retains a tubular member 29, preferably made of plastic, along the inner wall thereof on which is mounted a reed assembly generally indicated by 33. Reed assembly 33 is of a conventional construction and will produce a sound (such as a squeek) in response to air passing therethrough.

In order to operate grip assembly 13 when riding a bicycle provided therewith, the rider simply raps his hand around tubular body 17 of grip member 15, as shown in FIGS. 1 and 2, so that at least a portion of his fingers lay over housing 24 of assembly 13. If the rider wishes to produce a sound (in order to alert another rider or a pedestrian), the fingers of the rider may be pressed inwardly in order to compress housing 24. When the pressure in cavity 25 of housing 24 builds up, air in cavity 25 will be forced through pathway 29 to the outside, as shown by arrows A in FIG. 2, causing reed assembly 33 to produce a sound.

When all of the air in cavity 25 of housing 24 is depleted, the pressure of the rider's fingers is released and housing 24 will return to normal size. This will enable air from the outside to pass through pathway 29 and enter cavity 25, for later operation by the rider of the inventive grip assembly.

Optionally, since cap 27 may be visible to the interested observer, it may be desirable to design cap 27 with an aesthetically appealing configuration, such as that of an animal or other figure.

In order to aid the gripping of the grip assembly of the invention by the rider, the outside surface of tubular body 17 of grip member 15 may include a series of annular ribs.

It will thus be seen that the objects set forth above, among those made apparent from the proceeding description, are efficiently attained and, since certain changes may be made in the above product without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A handle grip assembly for a handle of a bicycle of comprising:

a grip member having an inner surface defining opening for receiving the end of a handle of a bicycle, an outside surface, and an outside end member;

a flexible housing disposed along at least a portion of said outside surface and defining a cavity located between said a least a portion of said outside surface and said housing;

a cap member mounted on said end member of said grip member;

a pathway being unobstructed to enable the air to flow from the inside cavity to the outside, located in said cap member and leading from inside of said cavity of said flexible housing to the outside;

means for producing a sound response to air leaving said cavity and passing through said pathway;

wherein said housing may be compressed from the outside thereof to cause air to leave said cavity to the outside through said pathway.

2. The handle grip assembly of claim 1, wherein said grip member also includes a first inner end over which a flange is disposed.

3. The handle grip assembly of claim 2, wherein said opening for receiving said handle and is formed through said flange.

4. The handle grip assembly of claim 1, wherein said sound producing means comprises a reed assembly disposed in said pathway.

* * * * *